United States Patent [19]
Maeshima et al.

[11] Patent Number: 6,092,113
[45] Date of Patent: Jul. 18, 2000

[54] METHOD FOR CONSTRUCTING A VPN HAVING AN ASSURED BANDWIDTH

[75] Inventors: Osamu Maeshima, Koganei; Yoshihiro Ito, Omiya; Masami Ishikura, Kunitachi; Tohru Asami, Hiki-gun, all of Japan

[73] Assignee: Kokusai Denshin Denwa, Co., Ltd., Tokyo, Japan

[21] Appl. No.: 08/919,244

[22] Filed: Aug. 28, 1997

[30] Foreign Application Priority Data

Aug. 29, 1996 [JP] Japan .................................. 8-227970

[51] Int. Cl.⁷ ...................................................... G06F 13/14
[52] U.S. Cl. .......................... 709/230; 709/223; 709/226; 709/229; 370/355; 370/360
[58] Field of Search ............................ 395/200.6, 200.59, 395/200.57, 200.68, 200.56; 370/355, 401, 395

[56] References Cited

U.S. PATENT DOCUMENTS

| | | | |
|---|---|---|---|
| 5,065,393 | 11/1991 | Sibbitt et al. ............................. | 370/232 |
| 5,265,091 | 11/1993 | Van Landegem ........................ | 370/360 |
| 5,577,035 | 11/1996 | Hayter et al. ............................. | 370/60 |
| 5,579,312 | 11/1996 | Regache .................................. | 370/60.1 |
| 5,581,703 | 12/1996 | Baugher et al. ...................... | 395/200.6 |
| 5,636,212 | 6/1997 | Ikeda ....................................... | 370/233 |
| 5,701,465 | 12/1997 | Baugher et al. ........................ | 395/610 |
| 5,732,078 | 3/1998 | Arango .................................... | 370/355 |
| 5,778,187 | 7/1998 | Monteiro et al. ........................ | 709/231 |
| 5,828,893 | 10/1998 | Wied et al. .............................. | 395/800 |
| 5,953,336 | 9/1999 | Moore et al. ............................ | 370/395 |

FOREIGN PATENT DOCUMENTS

0790751A2  8/1997  European Pat. Off. .

OTHER PUBLICATIONS

Christian Huitema, Routing In The Internet (pp. 219–232). ISBN. 0-13-132192-7, 1995.

Hiroshi Esaki, et al.—"High Speed Datagram Delivery over Internet Using ATM Technology"—IECE Trans. on Communications., vol. E78–B. No. 8, Aug. 1995, Japan.

B. Braden, et al.—"RSVP: a Resource ReSerVation Protocol", pp. 8–17, ConneXions, vol. 8, Aug. 1994 and INSPEC Abstract No. B9504–6150M–011, C9504–5640–008.

Fred Baker–13 "Real–Time Services for Router Nets"—pp. 85–90 Data Communications International, vol. 25, No. 7, May 21, 1996, USA and INSPEC Abstract No. B9608–6210R–015, C9608–5620–014.

*Primary Examiner*—Glenton B. Burgess
*Assistant Examiner*—Abdullahi E. Salad

[57] ABSTRACT

An IP tunnel is constructed between routers connected with the INTERNET. A bandwidth of the IP tunnel is assured by setting up a reservation resource protocol (RSVP) on the IP tunnel. Further as a traffic control of the routers and on the IP tunnel, a frequency for sending packets, which are processed by an input processor and an output processor inside of the router, is allotted based on a ratio of the reserved bandwidth in each IP tunnel, then an algorithm for controlling the traffic is simplified. Furthermore each of the routers on the IP tunnel has a function for scheduling a reservation and manages a time period at which the virtual private network (VPN) of a type of the reservation resource protocol (RSVP) will be used, then it is possible to reserve the assurance of the bandwidth on the designated date and time in the future.

11 Claims, 9 Drawing Sheets

PRIOR ART (RSVP)

INVENTION (PRINCIPLE)

INVENTION (PACKET SCHEDULING)

METHOD FOR CONSTRUCTING A VPN HAVING AN ASSURED BANDWIDTH

FIELD OF THE INVENTION

This invention relates to a method for constructing a VPN (Virtual Private Network) on the INTERNET, especially relates to assurance and/or reservation of a bandwidth by every host and/or sub-network.

BACKGROUND OF THE INVENTION

The VPN is a network which constructs logical groups on a public network such as the INTERNET, wherein the logical groups are mutually closed.

Generally, the public network such as the INTERNET is connected by the non-specific masses. Therefore, there is a security problem that it is not possible to avoid a dishonest access by a third party, because principally it is not possible that only specific users telecommunicate each other.

Therefore, recently the VPN technique has received more attention. According to the VPN technique, a dedicated line is virtually constructed on the INTERNET by considering a counterplan of the security of end to end, and, the dedicated line is used as a mainstay between LAN and LAN (Local Area Network).

Concretely, in the prior art of the VPN, a security is carried out by an encryption of data between end and end, an authentication of a user and a control of an access, then a closed group is provided by connected specific points via the INTERNET.

By constructing VPN on the public network, it is possible for only specific users to communicate with each other, and it is possible to use the INTERNET as a dedicated line.

However, because of its specification, the prior VPN does not assure network resources such as a bandwidth.

Namely, the prior VPN is different from an original dedicated line in that the bandwidth is variable by an influence of other traffic and that it is difficult to predict its telecommunication characteristics.

On the other hand, an RSVP technique is known. Wherein, the RSVP is a resource reservation protocol which attaches importance to a QoS (Quality of Service: bandwidth, delay, flicker).

Concretely, as shown in FIG. 7, all host terminals 201 in the specific LAN 200A and 200B connected with the INTERNET 100 and all routers 300A, 300B and 300C between LAN 200A and 200B must support the RSVP in each application as a unit. In FIG. 7, a mark R indicates a support of RSVP.

Therefore, by the RSVP in each application, the user requests a network resource which satisfies a specific service quality for example a specific bandwidth to the network, then the user assures it.

Namely, in the prior art, the network resource has been reserved between end and end in each application as a unit by the RSVP.

By the way, as shown in FIG. 1, if the routers 300A, 300B and 300C only support the RSVP in each application, an application on the RSVP cannot be connected with both LAN 200A and 200B, because the application is terminated by the routers 300A and 300B at both ends.

In a case of intending to assure the bandwidth of the VPN by combining prior art VPN with the RSVP, there are following problems (1) and (2).

(1) Since the network resources are assured by RSVP between end and end, all hosts connected to VPN must support RSVP.

(2) In the present utilization of VPN, a management in each host or sub-network as a unit is recommended than each application. In such case, an assurance of the bandwidth in each application is not proper. Wherein, the sub-network is a network which is made by further dividing a host part of the IP address into a network part and host part. For example, the LAN 200A or LAN 200B in FIGS. 7 and 8 is divided into sub-networks.

An object of the present invention is to provide a method for constructing a VPN which assures a bandwidth in each host or in each sub-network as a unit.

SUMMARY OF THE INVENTION

In the present invention which attains the above object, there is provided a method for constructing a VPN having assured bandwidth which comprises: constructing an IP tunnel between routers connected with the INTERNET; reserving a bandwidth of said IP tunnel by setting-up a reservation resource protocol (RSVP) on said IP tunnel.

In another method of the present invention, further as a traffic control of said router on said IP tunnel, a frequency for sending packets, which are processed by an input processor and an output processor inside of said router, is allotted based on a ratio of the reserved bandwidth in each IP tunnel.

In another method of the present invention, further each of said routers on said IP tunnel has a function for scheduling a reservation and manages, based on the reservation schedule, a time period at which said reservation resource protocol is used.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 9(*b*) shows a principle of the present invention; and

DETAILED DESCRIPTION OF PREFERRED EMBODIMENTS

A principle of the present invention will be explained referring to FIGS. 9(*a*), 9(*b*) and 10.

Figure 9A:
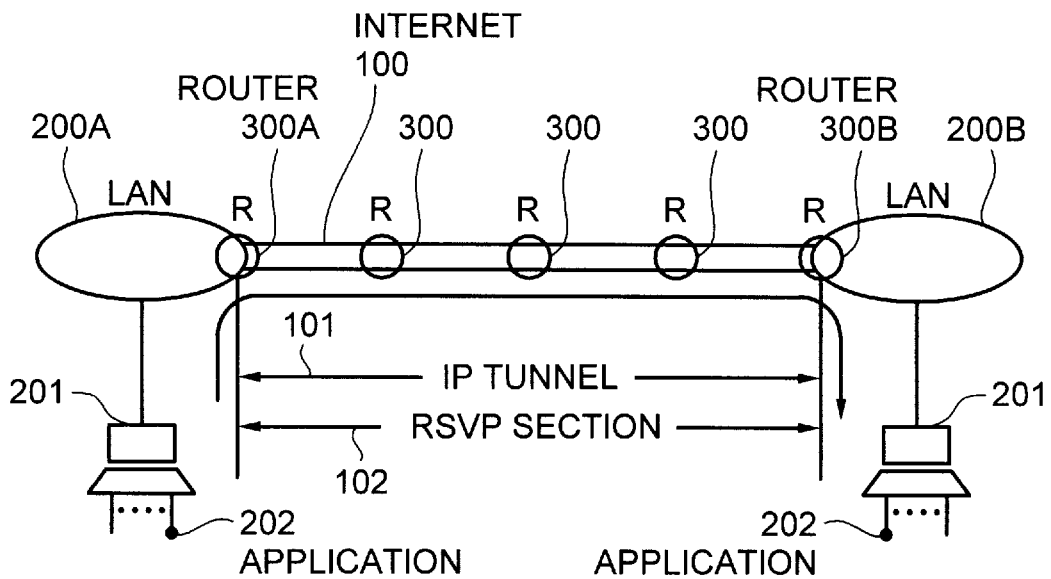
FIG. 9(*a*) shows a principle of the present invention.

In an example shown in FIG. 9(a), an IP (Internet Protocol) tunnel 101 is constructed between a router 300A and a router 300B respectively connected with the INTERNET. As well-known, the IP tunnel is a section where a packet exists, wherein said packet is constructed by adding or encapsulating, to an original packet, an IP header which has an IP address of the router 300A and an IP address of the router 300B (a start point and an end point of the IP tunnel 101) etc. A router in the end point, for example the router 300B, removes the IP header.

Therefore, the IP tunnel 101 becomes a VPN for the LAN 200A and the LAN 200B by passing, through the IP tunnel 101, all traffic between the LAN 200A and the LAN 200B which belongs to both of the routers 300A and 300B.

Each of the routers 300A, 300B and 300C on the IP tunnel 101 supports a RSVP (Reservation Resource Protocol), then these routers set up the RSVP on the IP tunnel 101. Each application 202 on both LAN 200A and 200B is encapsulated at the start point of the IP tunnel, because a bandwidth is assured at the IP tunnel 101 (between routers 300A and 300B) by the RSVP. Then, it is possible for the application 202, as the data adaptive to the RSVP between routers 300A and 300B, to use network resource (for example, a bandwidth) assured on the IP tunnel.

Figure 9B:
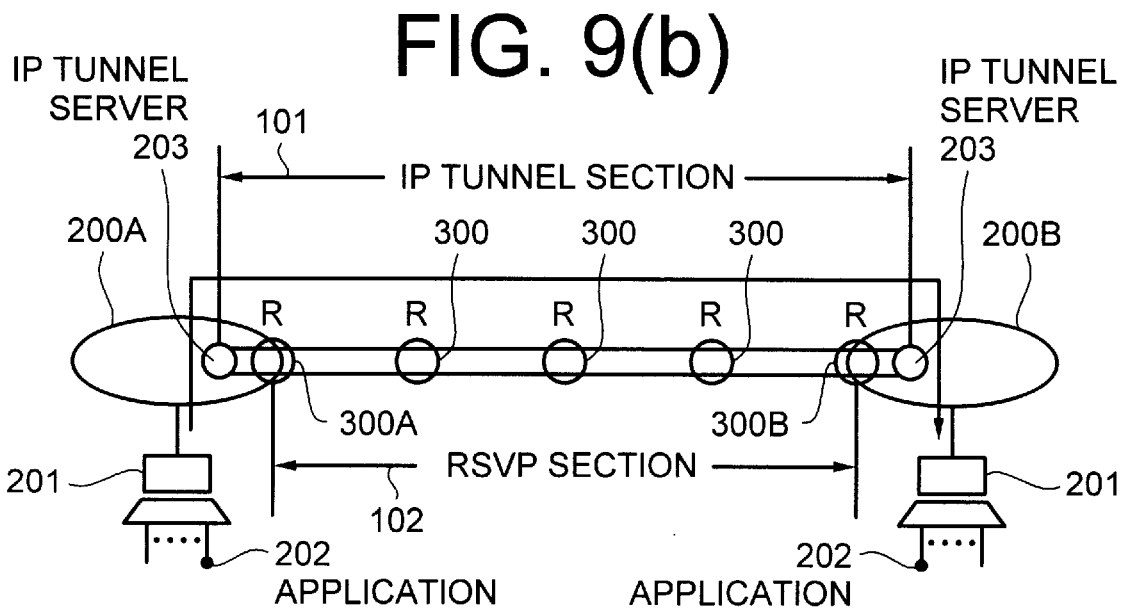

Wherein, as shown in FIG. 9(b), a section of the IP tunnel 101 at least includes a section where the RSVP assures the bandwidth (for example, a section between routers 300A and 300B).

Namely, it is possible to reserve a bandwidth in every IP tunnel. The bandwidth is reserved not by each application but by each host or each sub-network in the LAN 200A and 200B. It is not necessary for the host 201 to support the RSVP.

The reservation of the bandwidth is cancelled by sending a message of cancellation by the RSVP from the router 300A (or 300B) to others 300 and 300B (or 300 and 300A).

Since the bandwidth in assured on the RSVP, it is not necessary to change a parameter of each node manually, then a human cost can be deleted. Further, it is possible to speedily and flexibly allocate the bandwidth according to a short-term demand. Furthermore, it is easy to cancel the assured bandwidth.

As mentioned-above, by combining the IP tunnel 101 with the RSVP, it is possible to construct the VPN which enables assurance of the bandwidth in host 201 or sub-network as a unit without receiving the influence of another traffic.

While the RSVP is a protocol for reserving and establishing a network resource, it does not prescribe a concrete method for controlling a QoS (bandwidth, delay, flicker, etc.). Therefore, assurance of the QoS in the network is dependent on a traffic control of the router and/or a switch. A WFQ (Weight Fair Queuing) is a complex algorithm, because it controls a bandwidth and a delay by determining a priority according to traffic characteristics of an application, wherein the WFQ is known as an algorithm for a packet and/or a scheduling.

Figure 10:
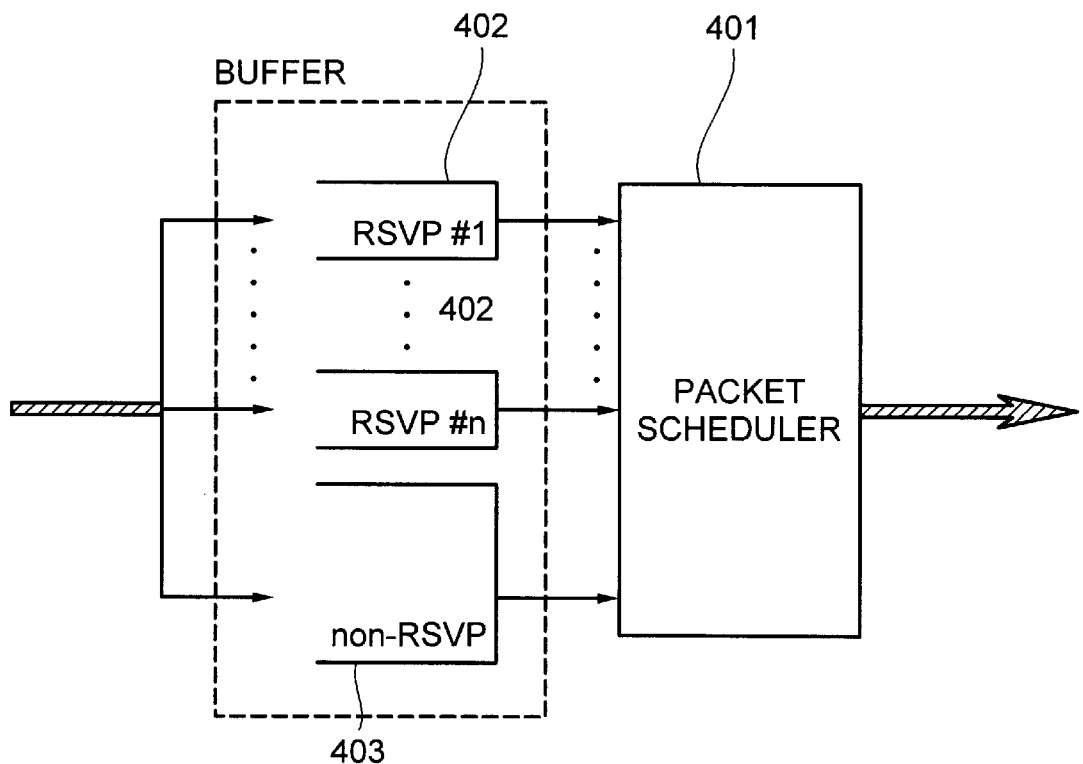
FIG. 10 shows an explanation for simplifying an algorithm of a packet scheduling.

In this case, since only bandwidth as the network resource is reserved, it is possible to control the assurance of the bandwidth by a simple algorithm of a packet scheduling as shown in FIG. 10 except for said complex algorithm of WFQ. Especially, the traffic control of each router 300A, 300 or 300B on the IP tunnel 101 is simplified by using an algorithm in that a frequency or a number of packets which are processed by an input processor and an output processor inside of said routers 300A, 300 and 300B, is allotted based on a ratio of the bandwidth reserved in each tunnel 101.

In FIG. 10, the packet schedule is carried out by a packet scheduler 401, a buffer 402 for plural RSVP (IP tunnel) #1–#n and a buffer 403 for non RSVP (a protocol except for RSVP). Namely, since a bandwidth between adjacent routers is divided into a bandwidth for each of the plural IP tunnels and a bandwidth for others (a bandwidth for non-IP tunnel), a buffer space in the each router is divided into the buffer 402 for the plural IP tunnels and the buffer 403 for others (for non-IP tunnel). It is assumed that a packet has arrived at each buffer 402 for RSVP with same distribution of traffic characteristics. Then, an algorithm is simplified by allotting a buffer size of each buffer 402 for RSVP and a frequency for packets which are sent from each buffer 402 for RSVP by the scheduler 401 based on a ratio of the reserved bandwidth in each IP tunnel. Wherein, the buffer 403 for non-RSVP sends out a packet in a low priority. For example, the buffer 403 for non-RSVP sends out a packet when no packet is in the buffer 402 for RSVP.

Furthermore, in the reservation of the network resources by using the original RSVP, the network resources are reserved only when the resources are necessary. However, in the present invention, it is possible to extend the original RSVP and to designate a date or a time when the reserved bandwidth will be used, because each of routers 300A, 300 and 300B on the IP tunnel 101 has a function for scheduling a reservation and manages a time period at which a VPN of a type of a reservation resource is used.

An embodiment of the present invention will be explained referring to FIGS. 1–6.

Figure 1:
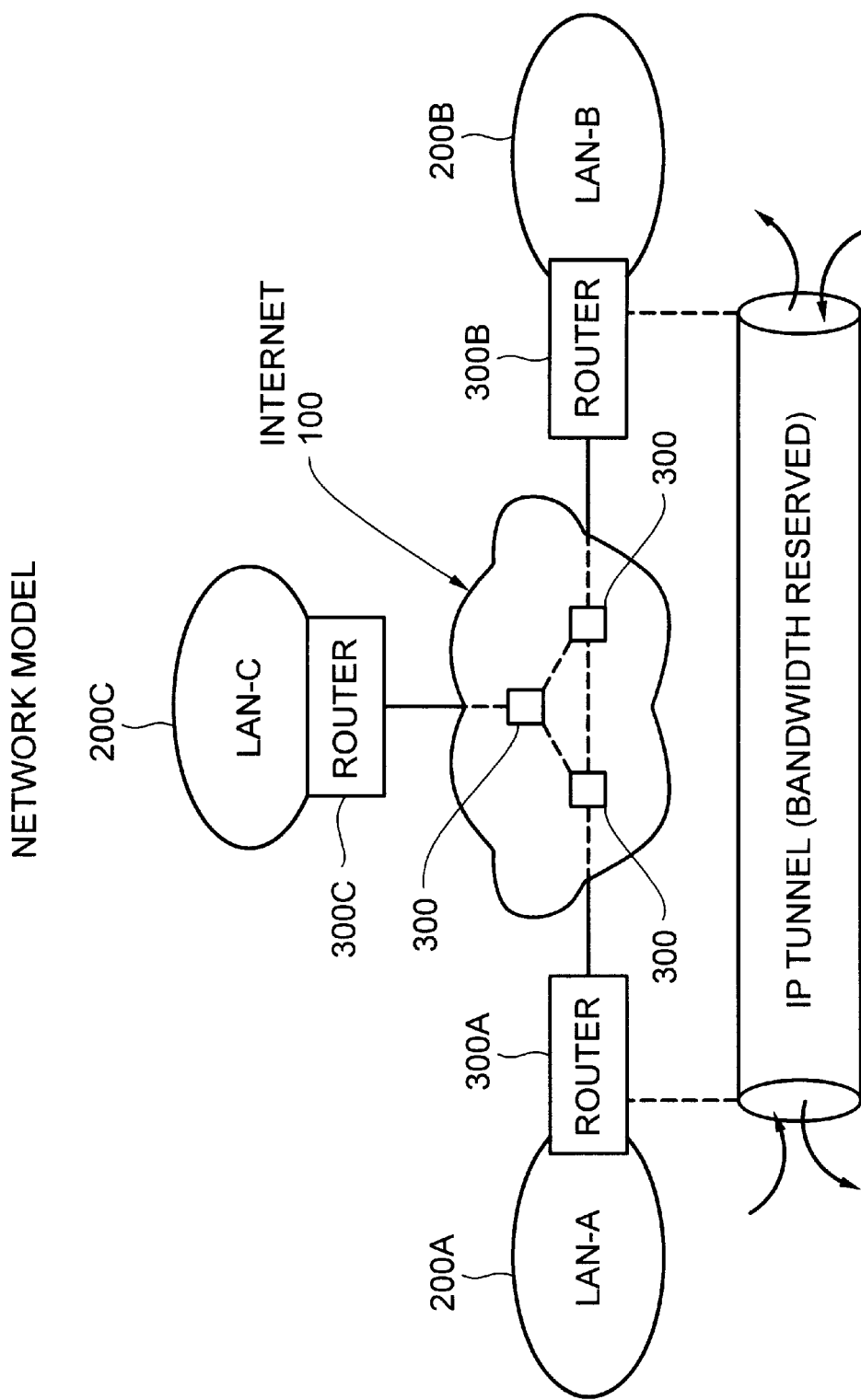
FIG. 1 shows a network model to which the present invention is applied.

In a network model shown in FIG. 1, three LANs 200A, 200B and 200C are connected with the INTERNET via routers 300A, 300B and 300C which support RSVP. A router 300 on the INTERNET also supports RSVP. An IP tunnel 101 is set between the router 300A and the router 300B, also an IP tunnel is set between the router 300B and the router 300C, and, an IP tunnel is set between the router 300C and the router 300A. Then, all traffic between LAN 200A and LAN 200B are passed through the IP tunnel 101, all traffic between LAN 200B and LAN 200C are passed through the IP tunnel between the router 300B and the router 300C, and, all traffic between LAN 200C and LAN 200A are passed through the IP tunnel between the router 300C and the router 300A.

The IP tunnel 101 is set by adding an IP tunnel function only on a machine (IP tunnel server) at both ends of the IP tunnel 101. Namely, a router at one end of the IP tunnel (for example, the router 300A) requests the setting of the IP tunnel to a router at another end of the IP tunnel (for example, the router 300B), then the IP tunnel is set.

As mentioned-above, encapsulation or cancellation of the IP packet at a start point or an end point of the IP tunnel is carried out in a range including a section 102 (shown in FIG. 9) where a bandwidth is assured by RSVP. Therefore, it is possible that the IP tunnel function is added by a provider of bandwidth (for example, a telecommunication carrier). Further, as shown in FIG. 9(b), it is possible for a user of the bandwidth to add the IP tunnel function on LANs 200A and 200B by using an IP tunnel server 203.

Furthermore, in this embodiment, transmission security is carried out by an encryption of data between LAN 200A and 200B, between LAN 200B and 200C, and, between LAN 200C and 200A, an authentication of a user and a control of an access, then LANs 200A, 200B and 200C are connected to each other via the INTERNET.

The router is constructed as shown in FIG. 1 for controlling the traffic. In this embodiment, each router has two input interfaces and two output interfaces, because a usual router has plural input interfaces and plural output interfaces.

In the router, at a process for assuring a bandwidth by RSVP before data transmission, the input buffer 301 for RSVP and one input buffer 302 for non-RSVP (for non-reserved-type packet) are set in an input side, and the output buffer 303 for RSVP and the output buffer 304 for non-RSVP are set in the output side. A number N of the input buffer 301 is the same number of the IP tunnel (a number of reservation). A number L+M of the output buffer 303 is larger than the number of the IP tunnel (a number of reservation). One output buffer 304 is set in each output interface. Wherein, a size of each buffer is variable according to the bandwidth reserved to each IP tunnel.

Figure 2:
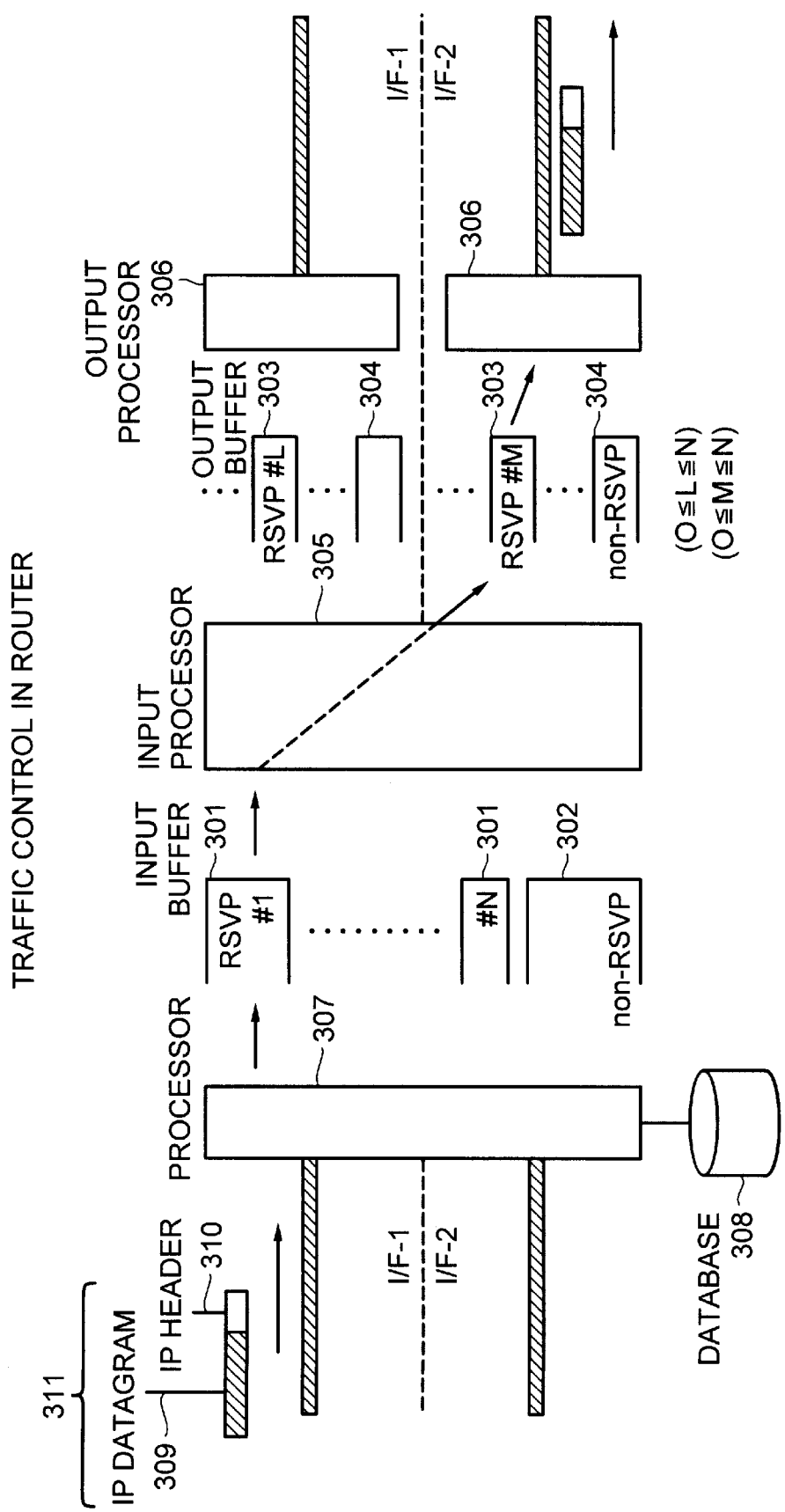
FIG. 2 shows a configuration of a traffic control in a router.

Further, the router comprises an input processor 305, an output processor 306 for each output interface, a processor 307 for identifying a reservation and a reservation database 308 linked to the processor 307. In the database 308, an existence of a bandwidth reservation and data which is necessary to identify, verify and confirm the content of a reservation (for example, IP address of sending side, IP address of receiving side, port number, protocol ID, reserved bandwidth, etc.) are stored. In FIG. 2, 309 denotes an original packet (IP datagram), 310 denotes an IP header in which the IP address of the routers at both ends of the IP tunnel and 311 denotes a encapsulated packet to which the IP header 310 was added.

The reservation of the bandwidth to the IP tunnel is carried principally when a host or a sub-network on a LAN needs the bandwidth. For the reservation, the host or sub-network informs a request for an assurance of a bandwidth to a router at one end of a section where a bandwidth is assured by RSVP, and, informs a content (for example, IP address of sending side, IP address of receiving side, port number, protocol ID, reserved bandwidth, etc.) of a reservation. The router transfers these information to other routers on a path and a router at another end of the IP tunnel by RSVP. Each router stores the reservation of the bandwidth and its content in the database 308. If a certain router cannot reserve the bandwidth, the router informs a message indicating a rejection of the request to the router at the point.

A traffic control in the router will be explained referring to FIGS. 2–4.

Figure 3:
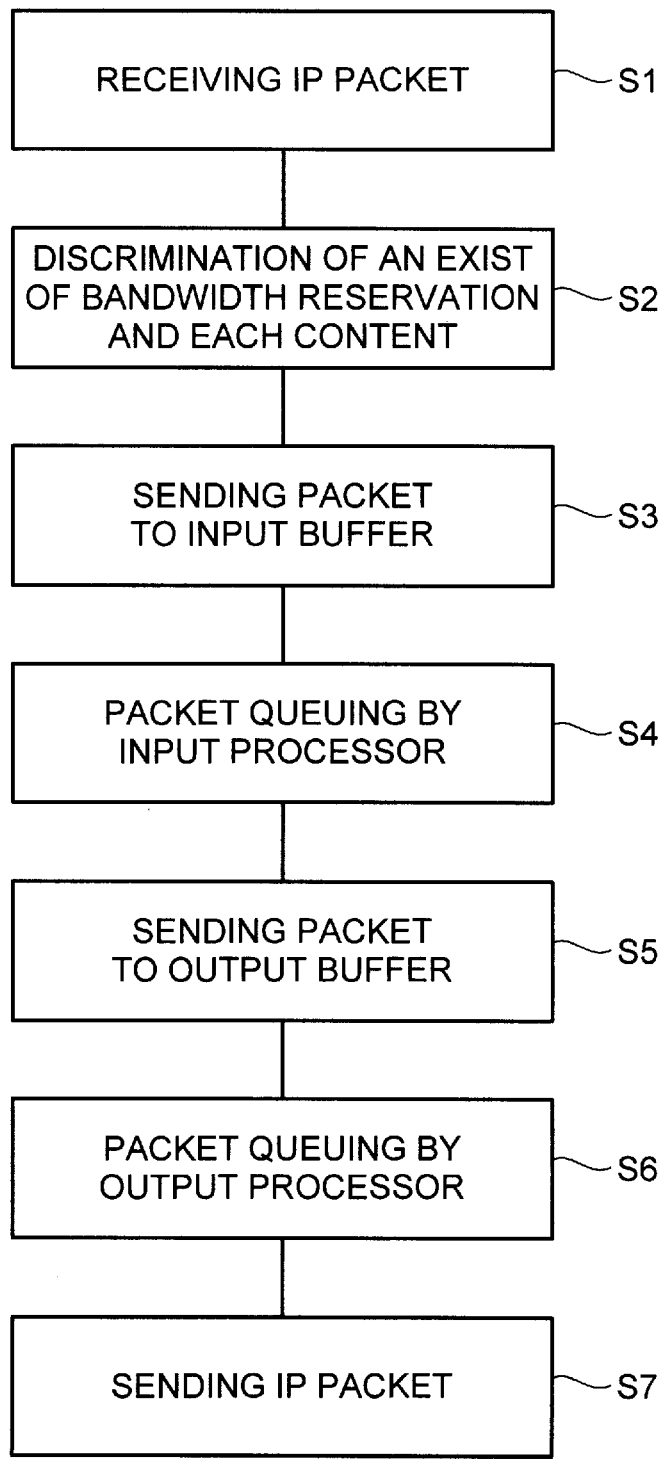
FIG. 3 shows a process of the traffic control in the configuration shown in FIG. 2.

(1) In steps S1–S2 shown in FIG. 3, the database 308, the processor 307 identifies, verifies and confirms an existence of a bandwidth reservation and each content of a reservation (for example, IP address of sending side, IP address of receiving side, port number, protocol ID, reserved bandwidth, etc.) to packets arrived at each input interface.

(2) After identification, verification and confirmation of the existence of a bandwidth reservation and the content of each reservation, in step S3 shown in FIG. 3, the processor 307 allocates the packets to the input buffer corresponding to the reserved IP tunnel.

(3) For transferring the packets, the input processor 305 obtains a packet from the input buffer having a high priority, as follows ①–②.

Figure 4:
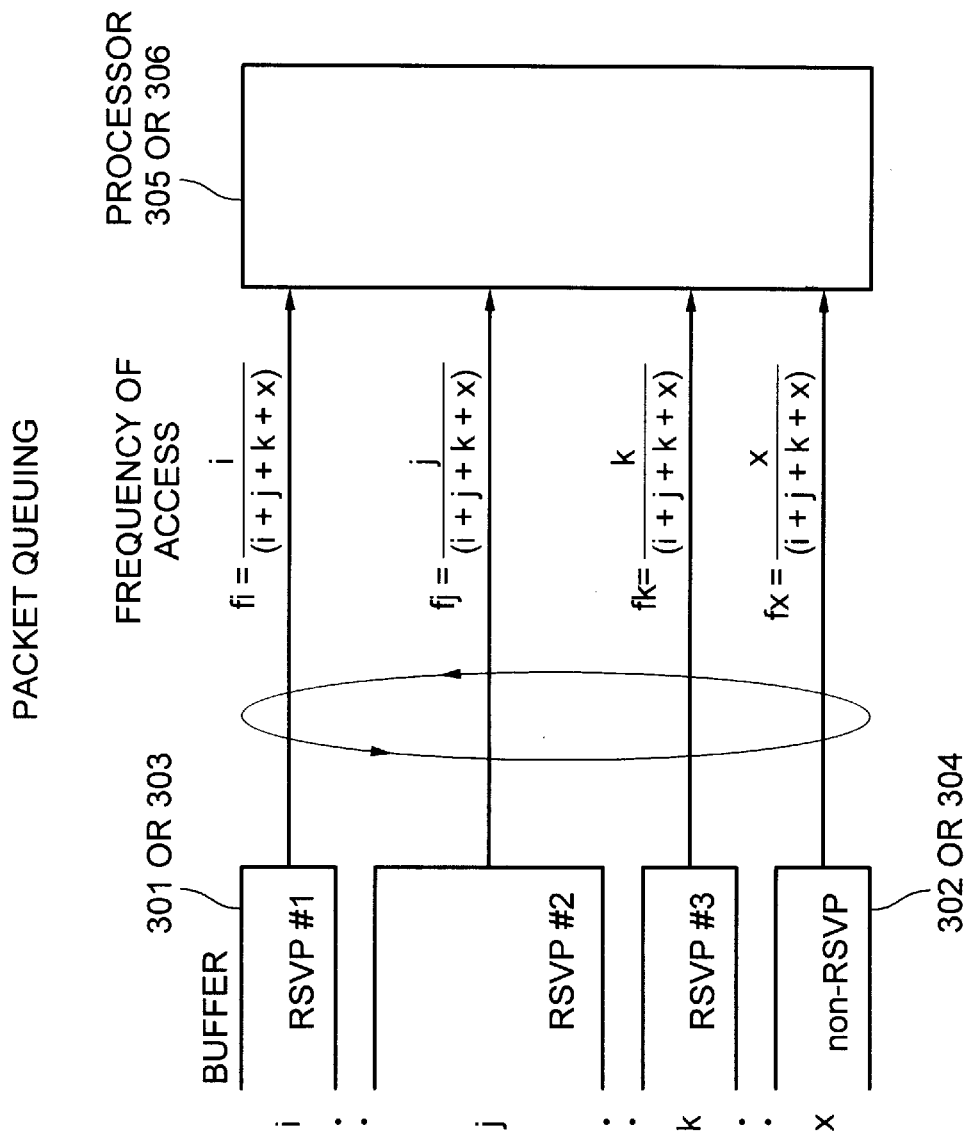
FIG. 4 shows a packet queuing in the traffic control.

① As shown in FIG. 4, it is assumed that three buffers #1, #2, #3 are used as the input buffer 301 for RSVP, one input buffer 302 for non-RSVP is used and a ratio of each reserved bandwidth of IP tunnels and non-reserved bandwidth is i:j:k:x.

② The input processor 305 takes out the packet from each input buffer by accessing each input buffer with a frequency fm according to the ratio of the bandwidth. The frequency fm is indicated by fm=m/(i+j+k+x), wherein m is any one of i,j,k and x. If no packet exists in all input buffers #1–#3 for RSVP when the input processor 305 accesses these buffers, the input processor 305 accesses the input buffer 302 for non-RSVP. If a packet exists in the input buffer 302, the input processor 305 takes it out from the buffer 302.

(4) After sending packets to the input buffers, the input processor transfers the packet to corresponding output buffer.

(5) In steps S6–S7 in FIG. 3, the output processor 306 corresponding to each output interface takes out the packet from the output buffer. Namely, ① As shown in FIG. 4, it is assumed that three buffers #1, #2, #3 are used as the output buffer 303 for RSVP, one output buffer 304 for non-RSVP is used and a ratio of each reserved bandwidth of IP tunnel and non-reserved bandwidth is i:j:k:x.

② The output processor 306 takes out the packet from each output buffer by accessing each output buffer with a frequency fm according to the ratio of the bandwidth. The frequency fm is Indicated by fm=m/(i+j+k+x), wherein m is any one of i, j, k, and x. If no packet exists in all output buffers #1–#3 for RSVP when the output processor 306 accesses these buffers, the output processor 305 accesses the output buffer 304 for non-RSVP. If a packet exists in the output buffers 304, the output processor 306 takes it out from the buffer 304.

Next, a reservation schedule function of VPN will be explained referring to FIGS. 5–6. As mentioned above, a reservation of network resources by using the original RSVP, causes the network resources to be reserved only when the resources are necessary. In the present embodiment, by the following processes (I)–(V), it is possible to designate a date or a time when the reserved bandwidth will be used. A step S28 in FIG. 5 is continued to a step S29 in FIG. 6.

Figure 5:
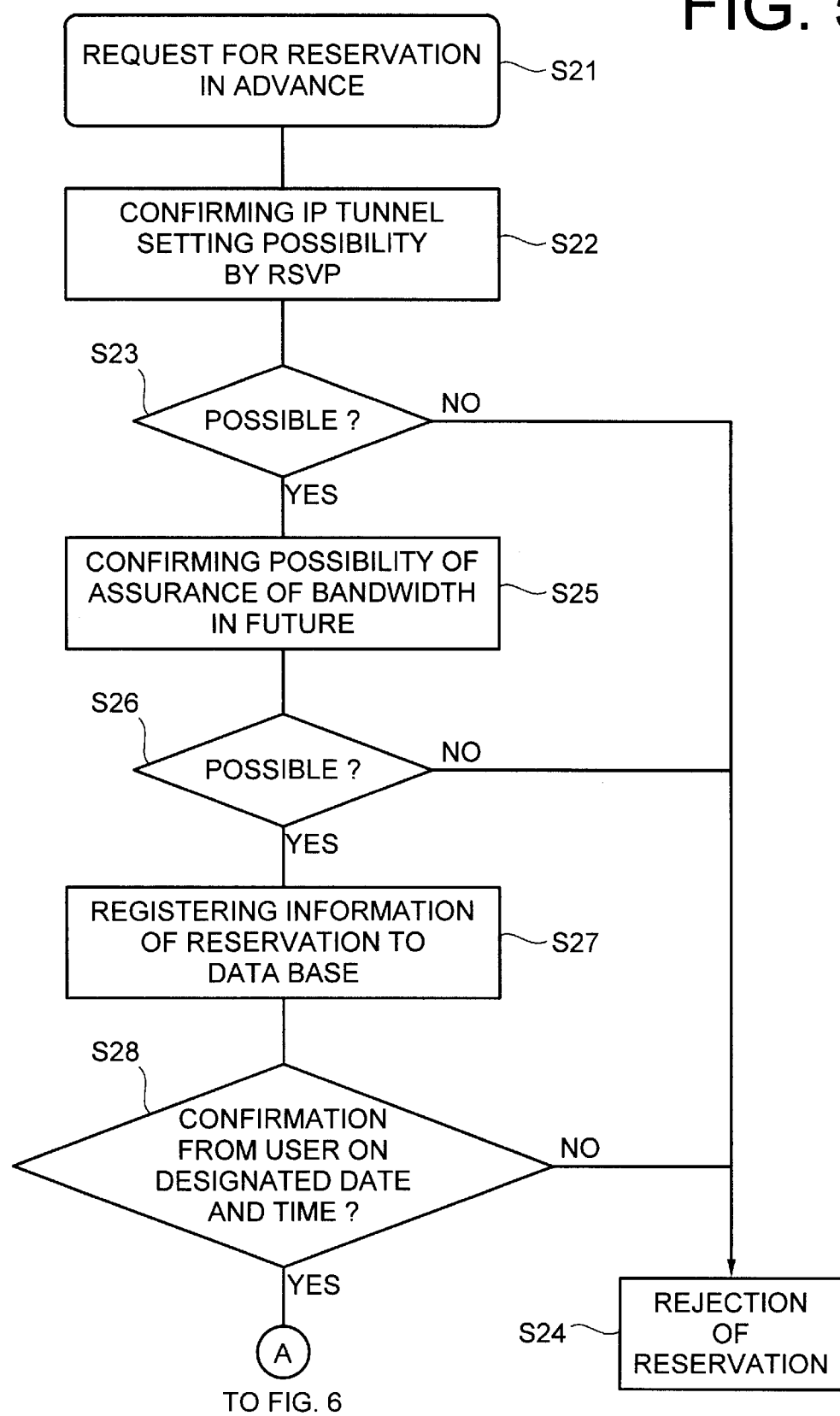
FIG. 5 shows a process of a reservation schedule of VPN in the router.

(I) As step S21 and S22 shown in FIG. 5, when it occurs to reserve in advance a use of the resource reservation -type VPN, it is confirmed whether a setting of a section for an IP tunnel by RSVP is possible or not. If impossible, as determined in steps S23 and S24, the reservation in advance is rejected.

(II) If the setting is possible, as shown in steps S23 and S25 in FIG. 5, it is confirmed whether an assurance of a bandwidth which will be required at future date and time is possible or not. If impossible, as shown in steps S26 and S24, the reservation in advance is rejected.

(III) If the assurance is possible, as shown in steps S26 and S27, necessary information of the reservation (date, time, bandwidth to be reserved, IP address of sending side, IP address of receiving side, port number, protocol ID, etc.) are registered in a database for reservation in all routers on a section for an IP address.

(IV) On the designated date and time, as shown in step S28 in FIG. 5 to step S31 shown in FIG. 6 and as in the following process ① and ②, the reserved bandwidth is provided.

① After monitoring the traffic during a predetermined period, as shown in steps S28 and S24 in FIG. 5, if no traffic exists from a host which reserved the bandwidth, the reservation in advance is rejected.

Figure 6:
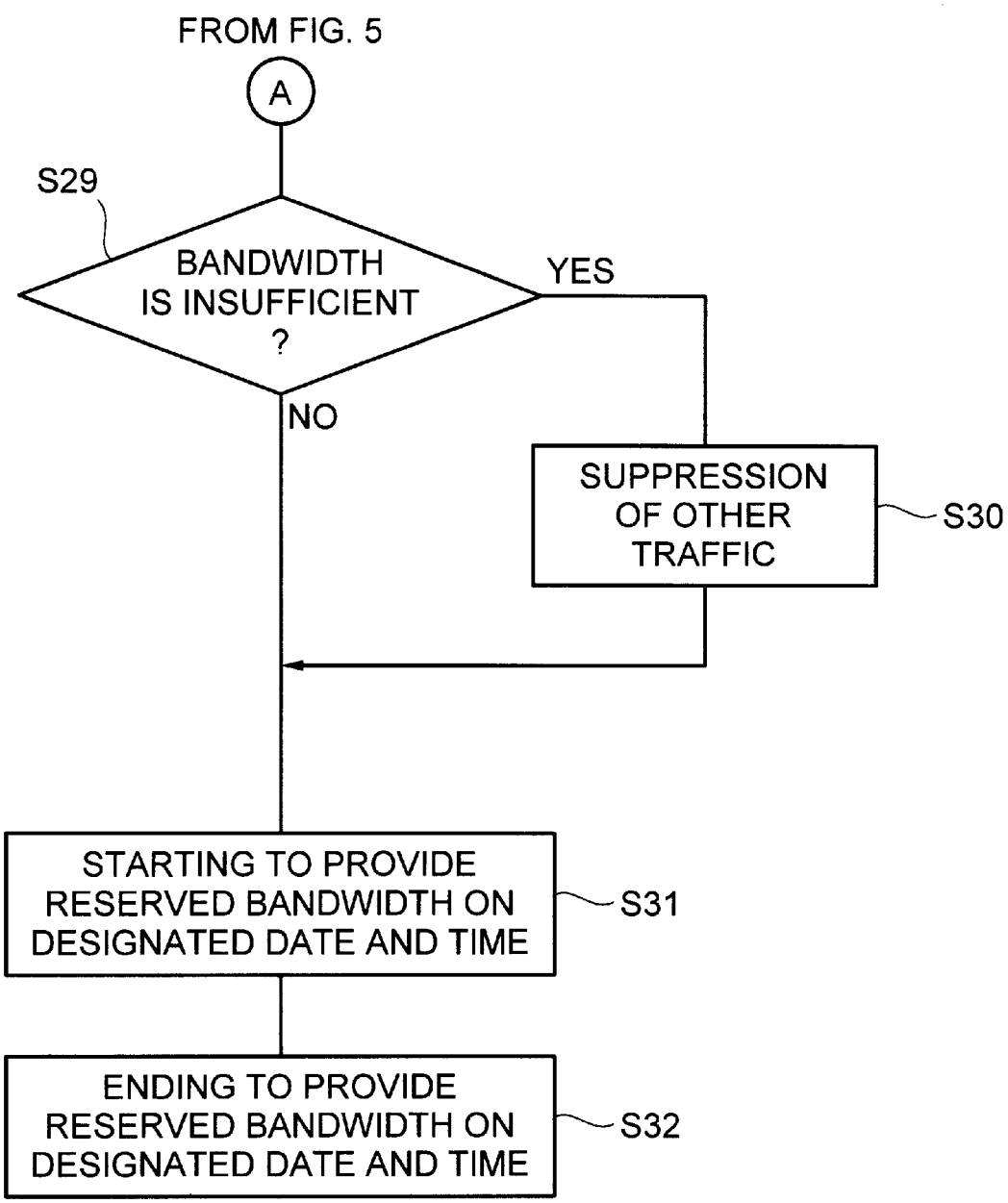
FIG. 6 shows a process of a reservation schedule of VPN in the router.
Figure 7:
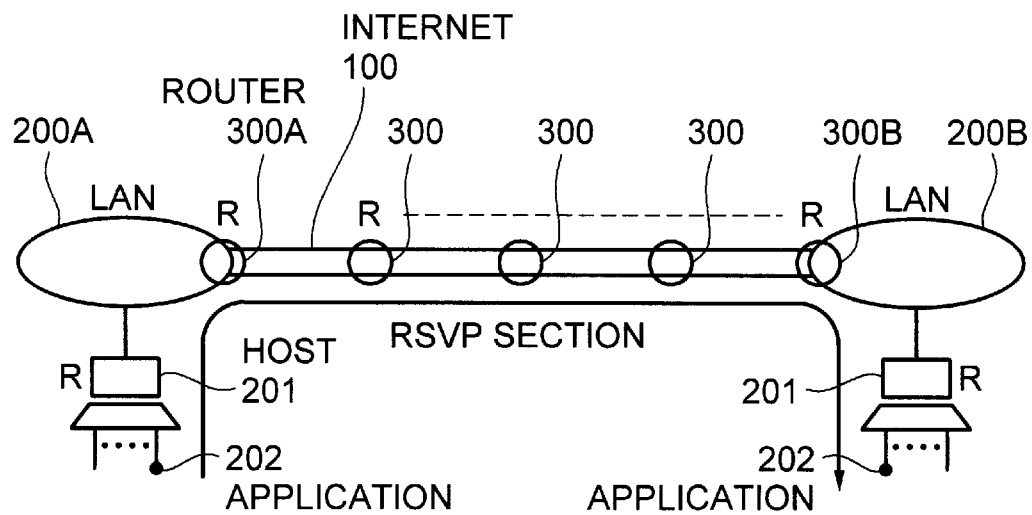
FIG. 7 shows a conventional RSVP.
Figure 8:
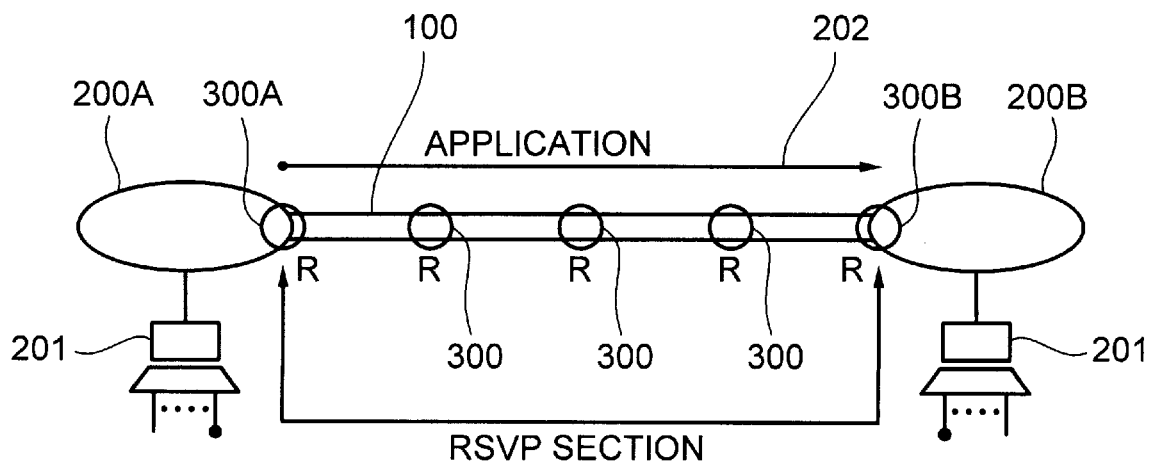
FIG. 8 shows a fault of the conventional RSVP when a host of a LAN does not support RSVP.

② As shown in steps S29 and S30 in FIG. 6, when a bandwidth is insufficient for traffic which is not reserved in advance or not scheduled, one of following traffic controls (a) and (b) is carried out according to a kind of the non-reserved traffic.

(a) If a protocol of the non-reserved traffic is not RSVP, all the traffic is rejected.

(b) If a protocol of the non-reserved traffic is RSVP, a message for cancellation of its reservation is sent to its user, then the reservation is rejected.

(V) After the designated date and time of the advance reservation, as shown in step S32 in FIG. 6, the method is completed to provide the reserved bandwidth.

According to the present invention, it is possible to obtain a traffic flow across a VPN which is not influenced by other traffic and more stable than a conventional VPN, because of constructing an IP tunnel between routers connected with the INTERNET and reserving a bandwidth of said IP tunnel by setting up a reservation resource protocol (RSVP) on said IP tunnel. It is not necessary for each application to reserve a network resource because an assurance of a bandwidth by RSVP is carried out by an IP tunnel between routers. Thus, it is not necessary for each host and/or sub-network to support RSVP. Setting and cancelling the assurance of the bandwidth are simplified, because the bandwidth is assured by RSVP. Therefore, it is not necessary to change a parameter of each node manually, thus eliminating a human cost. Further, it is possible to speedily and flexibly allocate bandwidth according to a short-term demand. Furthermore, the present invention is useful in transmitting a large amount of data in short-term usage.

Further, according to the present invention, an algorithm for traffic control is simplified, because, as a traffic control of said router on said IP tunnel, a frequency for sending packets, which are processed by an input processor and an output processor inside of said router, is allotted based on a ratio of the reserved bandwidth in each IP tunnel.

Furthermore, the reservation of the network resources using the original RSVP, the network resources are reserved only when the resources are necessary. According to the present invention, it is possible to reserve the assurance of the bandwidth on designated dates and times in future, because each of routers on the IP tunnel has a function for scheduling the reservation and manages a time period at which VPN of a type of RSVP will be used.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. A method for constructing a virtual private network (VPN) having assured bandwidth comprising:

constructing an IP tunnel between routers connected with the INTERNET;

reserving a desired bandwidth of the IP tunnel by setting-up a resource protocol on the IP tunnel;

scheduling a future reservation time period in which the bandwidth reservation will occur; and managing the IP tunnel during the reservation time period with said bandwidth reservation step to assure the bandwidth with the resource protocol wherein, as a traffic control of the routers on the IP tunnel, a frequency for sending packets, which are processed by an input processor and an output processor inside of the routers, is allotted based on a ratio of the reserved bandwidth in the IP tunnel.

2. A method of assuring bandwidth in a virtual private network, comprising:

utilizing routers connected to the Internet to establish an IP tunnel;

requesting a reservation schedule for reserving a desired bandwidth in advance of a time period specified in the reservation schedule;

managing the IP tunnel with a reservation resource protocol (RSVP) during the time period specified in the reservation schedule to assure the desired bandwidth in the IP tunnel;

said managing step giving low priority to non-RSVP packets during the time period specified in the reservation schedule; and said managing step allotting a frequency of processing packets sent and received between the routers across the IP tunnel based on a ratio of the desired bandwidth in the IP tunnel.

3. A method of assuring bandwidth in a virtual private network, comprising:

utilizing routers connected to the Internet to establish an IP tunnel;

requesting a reservation schedule for reserving a desired bandwidth in advance of a time period specified in the reservation schedule;

managing the IP tunnel with a reservation resource protocol (RSVP) during the time period specified in the reservation schedule to assure the desired bandwidth in the IP tunnel;

said managing step giving low priority to non-RSVP packets during the time period specified in the reservation schedule; and said managing step allotting a buffer size in each of the routers based on a ratio of the desired bandwidth in the IP tunnel.

4. A system for assuring bandwidth across a VPN operating on the internet, comprising:

a first router connected to the internet;

a second router connected to the internet;

said first and second routers establishing an IP tunnel across the internet;

said first router requesting a reservation schedule for reserving a desired bandwidth in advance of a time period specified in the reservation schedule, said first and second routers managing the IP tunnel with a resource protocol during the time period specified in the reservation schedule to assure the desired bandwidth in the IP tunnel;

said first and second routers each including an input processor and an output processor, said input and output processors allotting a frequency of processing packets sent and received between said routers across the IP tunnel based on a ratio of the desired bandwidth in the IP tunnel.

5. The system according to claim 4, said first and second routers each including a database connected to a respective processor, said processors confirming a possibility of assuring the desired bandwidth in response to the reservation schedule request, said processors storing the reservation schedule in the respective databases, said processors utilizing the databases to manage the IP tunnel.

6. The system according to claim 5, said processors rejecting the reservation schedule if said processors determine that the possibility of assuring the desired bandwidth does not exist.

7. The system according to claim 10, said routers suppressing non-RSVP traffic across the IP tunnel to assure the desired bandwidth during the time period specified in the reservation schedule.

8. A system for assuring bandwidth across a VPN operating on the internet, comprising:

a first router connected to the internet;

a second router connected to the internet;

said first and second routers establishing an IP tunnel across the internet;

said first router requesting a reservation schedule for reserving a desired bandwidth in advance of a time period specified in the reservation schedule, said first and second routers managing the IP tunnel with a resource protocol during the time period specified in the reservation schedule to assure the desired bandwidth in the IP tunnel;

said first router including resource protocol and non-resource protocol input and output buffers, said second router including resource protocol and non-resource protocol input and output buffers, said routers allotting resource protocol buffer size in each of the routers based on a ratio of the desired bandwidth in the IP tunnel.

9. The method claimed in claim 1, wherein the resource protocol is a reservation resource protocol (RSVP).

10. The system according to claim 4, wherein the resource protocol is a reservation resource protocol (RSVP).

11. The system according to claim 8, wherein the resource protocol is a reservation resource protocol (RSVP).

* * * * *